United States Patent Office 2,754,313
Patented July 10, 1956

2,754,313

STABILIZING METHYLPOLYSILOXANE FLUIDS

Willard T. Grubb, Schenectady, N. Y., assignor to General Electric Company, a corporation of New York No Drawing. Application April 9, 1954,
Serial No. 422,261

3 Claims. (Cl. 260—448.2)

The present invention relates to compositions of matter comprising methyl-substituted polysiloxanes which exhibit good resistance to gelation at elevated temperatures and method of preparing the same. More particularly the invention is concerned with a method for retarding gelation at an elevated temperature, for example, at 200° to 250° C., of a liquid composition comprising a methylpolysiloxane containing from about 1.98 to 2.25 methyl groups per silicon atom, which method comprises incorporating and intimately dispersing in the said methylpolysiloxane small amounts of bromine.

The liquid methylpolysiloxanes stabilized in accordance with the practice of my invention are more particularly described in Patnode Patent 2,469,890 issued May 10, 1949. Such liquid methylpolysiloxanes may be obtained by intercondensing hexamethyldisiloxane with cyclic dimethyl polysiloxanes, for instance, octamethylcyclotetrasiloxane, in the presence of small amounts of an acid, such as sulfuric acid. Alternatively, these liquid linear methylpolysiloxanes may be obtained by co-hydrolyzing trimethylchlorosilane with dimethyldichlorosilane with water. The methyl groups of these liquid methylpolysiloxanes are attached to the silicon atoms through carbon-silicon linkages.

When a liquid composition comprising a liquid methylpolysiloxane containing an average of from about 1.98 to 2.25 methyl groups per silicon atom is heated at an elevated temperature, for instance, at about 200 to 300° C. in the presence of air, many of these liquid polysiloxanes will gel in a relatively short period of time. In cases where such liquids are employed, for example, as lubricating or dielectric media, etc., such a change in properties is highly undesirable. I have now found that the time in which this gelation occurs may be materially extended by incorporating in the liquid methylpolysiloxane a gelation-retarder comprising bromine. The amount of bromine required is very small and may be, by weight, of the order of from about 0.05 to 5%, preferably 0.1 to 2%, bromine based on the weight of the methylpolysiloxane. Obviously large amounts of bromine may be added but the maximum practical point of bromine utility is the saturation point of the methylpolysiloxane with the bromine.

Various method may be employed to introduce the bromine in the polysiloxane. One method comprises incorporating the bromine at room temperature into the liquid methylpolysiloxane. Another method comprises heating the bromine to temperatures above its boiling point and bubbling in the bromine into the methylpolysiloxane, for a period ranging, for example, for about 1 to 10 minutes more, depending on the degree of saturation desired of the liquid methylpolysiloxane. The temperature at which the bromine is added is advantageously around room temperature although higher or lower temperatures may be employed within reasonable ranges.

In order that those skilled in the art may better understand how the present invention may be practiced, the following examples are given by way of illustration and not by way of limitation. All parts are by weight.

EXAMPLE 1

A liquid methylpolysiloxane was obtained by intercondensing hexamethyldisiloxane with octamethylcyclotetrasiloxane in the presence of a small amount of sulfuric acid to obtain a linear trimethylsilyl, chain-stopped methylpolysiloxane similar to that described in the aforementioned Patnode patent and having a viscosity of about 100 centistokes.

The above-prepared liquid methylpolysiloxane was mixed with various amounts of liquid bromine at room temperature (30° C.). Samples of the treated and untreated methylpolysiloxane oil were heated in a 200° C. and in a 250° C. oven in air and the time noted when gelation of the samples occurred. The following table shows the time of gelation occurring at the two temperatures for the different liquid methylpolysiloxanes both without and with varying amounts of bromine present in the liquid methylpolysiloxane.

Table I

| Sample No. | Weight Percent Bromine in Methylpolysiloxane | Temperature of Test, °C. | Time in Hours to Reach Gelation |
|---|---|---|---|
| 1 | 0.0 (control) | 200 | 250 |
| 2 | 0.06 | 200 | 528 |
| 3 | 0.1 | 200 | 1,350 |
| 4 | 0.5 | 200 | 2,200 |
| 5 | 1.2 | 200 | 2,488 |
| 6 | 0.0 (control) | 250 | 24 |
| 7 | 0.06 | 250 | 38 |
| 8 | 0.2 | 250 | 298 |
| 9 | 0.5 | 250 | 689 |
| 10 | 0.9 | 250 | 1,900 |

I have also found that the gelation retarding properties of the bromine in the methylpolysiloxane oil can be improved even more by treating the latter bromine-modified methylpolysiloxane oils with small amounts of red phosphorus of the order of from about 1 to 10%, by weight, based on the weight of the methylpolysiloxane, and removing the solid material including the red phosphorus from the treated composition. The following example shows the improvements in gelling retardation obtainable by this procedure.

EXAMPLE 2

The bromine-modified methylpolysiloxane oils (which had not been heat-treated) described in Example 1 containing, by weight, 0.1% and 0.5% bromine, namely, sample Nos. 3 and 4, as well as the control sample which had not been treated with bromine, namely, sample 1, were each shaken with 5%, by weight thereof, of red phosphorus, and thereafter each mixture of ingredients was filtered to remove the insoluble material. Contrary to what might be expected, the bromine color in the methylpolysiloxane oil was still present in those samples which had been treated with bromine indicating that the red phosphorus had not removed all the bromine. Each sample treated in this manner was then heated at 250° C. to determine the time at which gelation of the sample took place. The sample which had not been treated with bromine gelled within 24 hours. The samples which contained 0.1% and 0.5% bromine and which had in addition been treated with the red phosphorus did not show any indications of gelation even after 5300 hours at 250° C.

The mechanism whereby the bromine is able to stabilize the liquid methylpolysiloxane against gelation is not clearly understood. It is believed that the bromine is present as elementary bromine closely associated with the methylpolysiloxane molecules, since if a brominated sample, prior to heat-aging, is shaken with silver to remove the bromine, the heat life of the thus-treated methylpolysiloxane is materially reduced to a point where it is substantially the same as the heat life of a methylpolysiloxane which had not been subjected to bromination. However, it should be noted that the bromine is still strongly attached to the polysiloxane molecule since tests have shown that even after pumping a brominated liquid methylpolysiloxane for 700 hours on a high vacuum line at room temperature, the heat aging of the sample was essentially the same, indicating that the bromine was still available as a gelation retarder. Of additional significance is the fact that the bromine-treated methylpolysiloxanes are not corrosive toward aluminum foil as might be expected if elementary bromine were allowed to contact aluminum.

The compositions herein defined can be employed as lubricating and dielectric media, and in hydraulic applications where it is essential that the liquid methylpolysiloxane be capable of withstanding elevated temperatures for long periods of time or extremely high temperatures, for instance, well above 250° C. for short periods of time, without undesirable change in the viscosity of the methylpolysiloxane. In this respect, the stabilized methylpolysiloxanes herein described are eminently suitable in hydraulic systems in various heavy machinery, as lubricating compositions between bearing surfaces subject to elevated temperatures, for instance, such as in motors, etc.

What I claim as new and desire to secure by Letters Patent of the United States is:

1. The method of retarding gelation at elevated temperatures of a liquid methylpolysiloxane which comprises incorporating in the said polysiloxane from 0.05 to 5% bromine, based on the weight of the methylpolysiloxane.

2. The method of retarding gelation at elevated temperatures of a liquid methylpolysiloxane which comprises (1) incorporating in the said polysiloxane from 0.05 to 5%, bromine based on the weight of the methylpolysiloxane and (2) thereafter treating the bromine-containing methylpolysiloxane with red phosphorus and removing the insoluble material.

3. A composition of matter exhibiting good resistance to gelation at elevated temperatures comprising (1) a liquid methylpolysiloxane and (2) from 0.05 to 5% by weight, bromine based on the weight of the liquid methylpolysiloxane.

References Cited in the file of this patent

Vandervort et al.: "Jour Am. Chem. Soc.," vol. 70 (1948), page 3148.